April 20, 1954  J. E. WHITT  2,676,063
DRIVE WHEEL MOUNTING FOR AGRICULTURAL TRACTORS
Filed Sept. 19, 1952  2 Sheets-Sheet 1
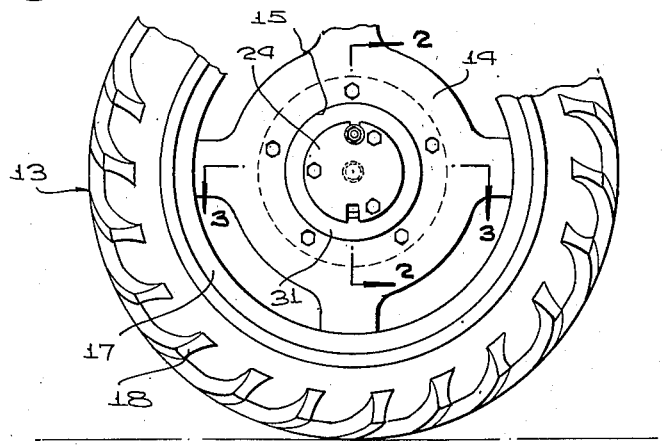
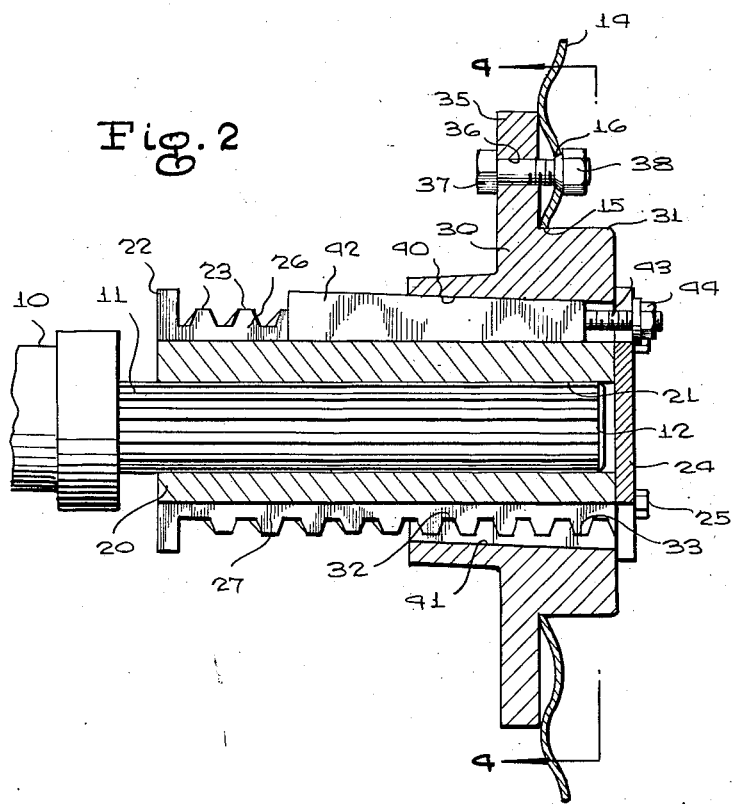
INVENTOR.
JAMES E. WHITT
BY
McMorrow, Berman + Davidson
ATTORNEYS April 20, 1954  J. E. WHITT  2,676,063
DRIVE WHEEL MOUNTING FOR AGRICULTURAL TRACTORS
Filed Sept. 19, 1952  2 Sheets-Sheet 2
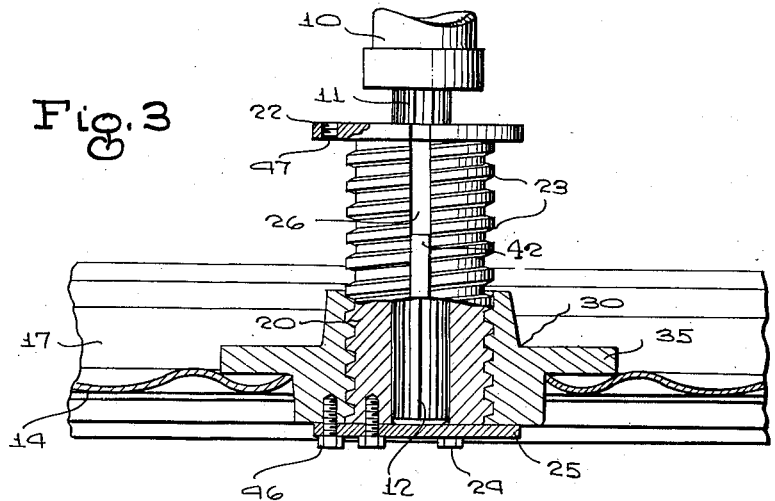
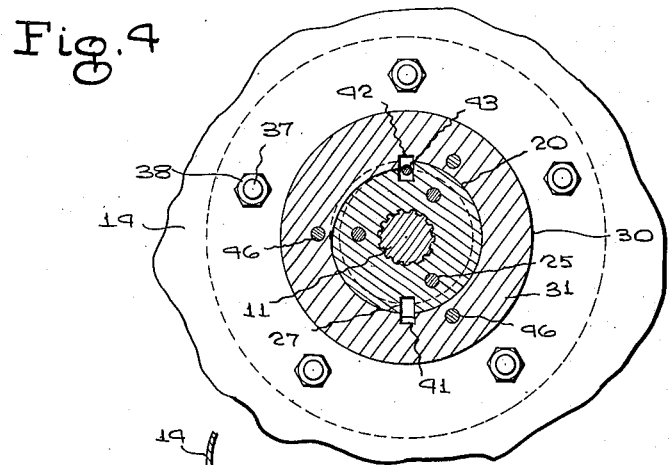
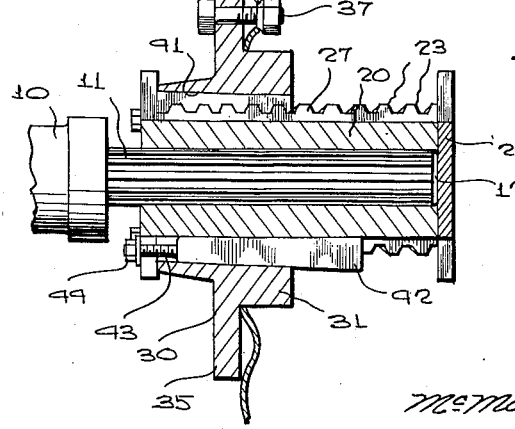
INVENTOR.
JAMES E. WHITT
BY
McMorrow, Berman + Davidson
ATTORNEYS Patented Apr. 20, 1954

2,676,063

UNITED STATES PATENT OFFICE 2,676,063

DRIVE WHEEL MOUNTING FOR AGRICULTURAL TRACTORS

James E. Whitt, Bondville, Ill.

Application September 19, 1952, Serial No. 310,383

3 Claims. (Cl. 301—1)

This invention relates to drive wheel mountings for agricultural tractors and more particularly to a drive wheel mounting having a spiral thread or worm for moving the drive wheels toward or away from the frame of the tractor by power supplied by the tractor engine.

It is among the objects of the invention to provide an improved drive wheel mounting for an agricultural tractor which provides for moving the drive wheels along the drive axles toward and away from the tractor frame by power provided by the tractor engine to decrease or increase the tread of the drive wheels for different operations, such as for plowing or for cultivating row crops; which eliminates the necessity of jacking up the rear end of the tractor and releasing the drive wheels from the axles in order to move the wheels to decrease or increase the tread; which includes parts that can be installed between an existing tractor wheel and an associated axle without the necessity of modifying the existing wheel or drive axle; which precludes the dangerous possibility of the wheel being run entirely off of the associated axle while being moved outwardly away from the tractor frame; which provides a driving connection of adequate strength between the axle and the wheel; and which is simple and durable in construction, economical to manufacture, easy to install, and positive and effective in operation.

Other objects and advantages will become apparent from a consideration of the following description and the appended claims in conjunction with the accompanying drawings, wherein:

Figure 1 is an elevational view of a tractor drive wheel with a drive wheel mounting illustrative of the invention secured therein;

Figure 2 is a fragmentary cross sectional view on an enlarged scale on the line 2—2 of Figure 1;

Figure 3 is a fragmentary cross sectional view on an enlarged scale on the line 3—3 of Figure 1;

Figure 4 is a cross sectional view on the line 4—4 of Figure 2; and

Figure 5 is a cross sectional view on a reduced scale similar to Figure 2 but showing the parts in a different operative position from that illustrated in Figure 2.

With continued reference to the drawing, the numeral 10 indicates a rear axle housing of an agricultural tractor and the numeral 11 indicates a drive axle extending through the housing 10 and having a longitudinally splined end portion 12 projecting outwardly from the end of the associated housing.

The numeral 13 generally indicates a tractor drive wheel having a central web structure 14 provided with a central, hub-receiving opening 15 and bolt holes 16 spaced apart around the opening 15. The numeral 17 indicates a tire rim mounted peripherally on the web structure 14 coaxially of the hub-receiving opening 15 in the web structure and the numeral 18 indicates a pneumatic tire mounted on the tire rim 17.

The drive wheel mounting of the present invention comprises an elongated sleeve 20 formed of a suitable material, such as cast iron or steel, of substantially cylindrical shape and having a longitudinally splined bore 21 extending coaxially therethrough and receiving the splined end portion 12 of the tractor axle 11, the original tractor axle being used without modification in the installation of the wheel mounting. The sleeve 20 has at its end adjacent the outer end of the axle housing 10 an outwardly projecting annular flange 22 and is provided on its outer surface between the flange 22 and the end of the sleeve remote from the axle housing 10 with a spiral thread or worm formation 23. The sleeve is secured on the associated axle by suitable means, such as a set screw, of the character used to secure the original wheel hub on the axle and an end plate 24 is disposed over the end of the sleeve 20 remote from the sleeve flange 22 and secured to the sleeve by suitable means, such as the spaced apart stud bolts 25 extending through apertures in the plate and threaded into registering tapped holes in the corresponding end of the sleeve. The plate 24 has a diameter substantially the same as the diameter of the flange 22 and extends marginally outwardly of the sleeve to provide a stop shoulder at the adjacent end of the sleeve corresponding to the stop shoulder provided by the flange 22 at the inner end of the sleeve.

Keyways 26 and 27 extend longitudinally of the sleeve at diametrically opposite locations around the sleeve and through the worm formation 23 and the flange 22 and plate 24 are provided with notches registering with the adjacent ends of the keyways 26 and 27.

A wheel hub 30 having a central portion 31 of cylindrical shape received in the central opening 15 in the wheel web structure 14 is provided with a bore 32 which is coaxial of the cylindrical center portion 13 of the hub which bore receives the sleeve 20 and is provided with a spiral groove formation 33 which receives the spiral worm formation 23 on the sleeve. The hub also includes an outwardly projecting annular flange 35 surrounding the central portion 31 and this flange is provided with spaced apart holes 36 which register respectively with the bolt holes 16 in the web structure 14. Hub bolts 37 extend one through each pair of registering holes in the flange 35 and the web structure 14 and nuts, as indicated at 38, are threaded one onto each of these bolts at the outer side of the web structure to firmly secure the web structure to the hub.

The hub 30 is provided at diametrically opposite locations around the bore 32 thereof with keyways 40 and 41 which extend longitudinally of the bore and through the groove formation 33.

A tapered key 42 is disposed in one of the keyways 26 or 27 in the sleeve 20 and extends into a registering keyway 40 or 41 in the hub 30 and partially through the bore of the hub. A screw threaded shank 43 extends from the smaller end of the key 42 longitudinally of the key and through the adjacent notch in the sleeve flange 22 or the end plate 24 and a nut 44 is threaded onto the shank at the outer side of the sleeve flange or end plate to draw the key into firm wedging relationship between the sleeve 20 and the hub 30.

When the hub is near the outer end of the sleeve the shank 43 will be extended through one of the notches in the plate 24, as illustrated in Figure 2 and, when the hub is near the inner end of the sleeve, the shank 43 will be extended through one of the notches in the sleeve flange 22, as illustrated in Figure 5.

Assuming that the hub is at one end of the sleeve and it is desired to move it to the other end to increase or decrease the tread of the rear wheels of the tractor, the nut 44 is first removed from the shank 43 and the key 40 is then forced out of the keyways in which it is disposed and removed from the assembly. The keys in the drive wheel mountings of both of the drive wheels will, of course, be removed at the same time, to provide for simultaneous movement of the wheels along the corresponding axles, and the engine will then be drivingly connected to the tractor axles to rotate the axles and the corresponding sleeves relative to the wheel hubs. The engine will be connected to the axles in either forward or reverse drive depending on whether it is desired to move the wheels outwardly or inwardly relative to the tractor frame and the axles will be driven until the sleeves have been threaded through the corresponding hubs to the desired extent. Normally, the hubs will be moved entirely from the ends of the sleeves at which they are located to the opposite ends of the sleeves but, the movement may be discontinued with the hubs intermediate the length of the sleeves, if desired. After the hubs have been moved to the desired position along the corresponding sleeves the keys 42 are replaced and the nuts 44 threaded onto the screw threaded shanks 43 to wedge the keys in position between the corresponding sleeves and hubs.

If there should be differences in the movement of the two wheels, after one wheel has been brought to the desired location, the hub may be keyed to the corresponding sleeve and movement of the axle associated with the other wheel continued until the corresponding hub has also been brought to the desired location relative to the associated sleeve and then the hub keyed to the sleeve, the tractor differential providing for the continued movement of one axle while the other is held stationary.

The end plate 24 and the end flange 22 are provided with bolt holes between the notches therein and stud bolts 46 are extended through these holes and threaded into registering tapped holes in the ends of the sleeve 20 to provide an additional lock between the sleeve and the hub when the sleeve is drivingly connected to the hub. When the hub is adjacent the end plate 24 the locking bolts 46 will extend through the apertures in the end plate and be threaded into tapped holes in the adjacent end of the hub and when the hub is at the end of the sleeve carrying the end flange 22 the locking bolts 46 will be inserted through the bolt holes, as indicated at 47, in the flange and threaded into registering tapped holes in the adjacent end of the hub. These locking bolts are preferably spaced apart at angular intervals of approximately one-hundred and twenty degrees around the bore of the hub and are removed at the same time that the keys are removed to free the sleeves for rotation in the corresponding hubs.

With this arrangement, the drive wheels can be moved toward or away from each other to vary the tread of the tractor by use of the tractor engine and without the necessity of having to jack up either rear wheel or the rear end of the tractor and freeing the wheels from the associated axles. The mounting also provides a driving connection of adequate strength between each axle and the associated wheel and permits the use of the axles and wheels provided as original equipment on the tractor without modification of these parts.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a tractor drive axle having a hub receiving end portion and a tractor drive wheel having a web structure provided with a central hub receiving opening and bolt holes spaced apart around said opening, mounting means providing a driving connection between said axle and said wheel and providing for movement of said wheel inwardly or outwardly along said axle by power rotation of said axle comprising a sleeve having a coaxial bore receiving the end portion of said axle and having an outwardly directed annular flange on one end and a spiral worm formation extending from said flange to the other end thereof, a hub having a coaxial bore receiving said sleeve and provided with a spiral groove formation within said bore receiving said worm formation, said hub having a central portion received in the central opening in said wheel web structure and an annular flange overlying the portion of said web structure adjacent said central opening and provided with holes registering respectively with the bolt holes in said web structure, stud bolts extended one through each of said bolt holes in said hub flange and through the registering bolt holes in said wheel web structure securing said web structure to said hub, an end plate secured to said sleeve at the end of the latter remote from said sleeve flange and extending marginally outwardly of said sleeve, said sleeve having at least one keyway extending longitudinally thereof through said worm formation, said hub having in the bore thereof at least one keyway extending through the groove formation therein and said sleeve flange and said plate having notches therein registering with the adjacent end of the keyway in said sleeve, a tapered key disposed in said keyways, a screw threaded shank extending from the smaller end of said key through the adjacent one of said notches, and a nut threaded onto said shank and bearing against the structure adjacent the corresponding notch to wedge said tapered key firmly in said keyways, said key being removable from said keyways to free said sleeve for rotational movement relative to said hub to move the hub along the sleeve between said sleeve flange and said end plate.

2. In combination with a tractor drive axle having a splined portion extending therealong from its outer end and a tractor drive wheel having a web structure provided with a central hub receiving opening, mounting means providing a driving connection between said axle and said wheel and providing for movement of said wheel inwardly or outwardly along said axle by power rotation of said axle comprising a sleeve having a splined coaxial bore receiving the splined end portion of said axle and having an outwardly directed annular flange on one end and a spiral worm formation extending from said flange to the other end thereof, a hub secured to said wheel web formation and having a coaxial bore receiving said sleeve and provided within said bore with a spiral groove formation receiving said worm formation, an end plate secured to said sleeve against the end of the latter remote from the sleeve flange and extending marginally beyond said sleeve to provide at the adjacent end of said sleeve a stop shoulder corresponding to the stop shoulder provided by said sleeve flange at the other end of said sleeve, at least one keyway extending longitudinally of said sleeve, at least one complementary keyway provided in the bore of said hub and extending longitudinally of said bore, and a key removably seated in said keyways to provide a driving connection between said sleeve and said hub, said key being removable from said keyways to provide freedom of rotational movement of said sleeve relative to said hub for threading said hub along said sleeve in one direction or the other depending upon the direction of rotational movement imparted to said sleeve.

3. In combination with a tractor drive axle having a hub receiving end portion and a tractor drive wheel having a wheel structure provided with a central hub receiving opening, mounting means providing a driving connection between said axle and said wheel and providing for movement of said wheel inwardly or outwardly along said axle by power rotation of said axle comprising a sleeve having a coaxial bore receiving end portion of said axle and having an outwardly directed annular flange on one end and a spiral worm formation extending from said flange to the other end thereof, a hub secured to said wheel web formation and having a coaxial bore receiving said sleeve and provided within said bore with a spiral groove formation receiving said worm formation, an end plate secured to said sleeve against the end of the latter remote from the sleeve flange and extending marginally beyond said sleeve to provide at the adjacent end of said sleeve a stop shoulder corresponding to the stop shoulder provided by said sleeve flange at the other end of said sleeve, at least one keyway extending longitudinally of said sleeve, at least one complementary keyway provided in the bore of said hub and extending longitudinally of said bore, a key removably seated in said keyways to provide a driving connection between said sleeve and said hub, said key being removable from said keyways to provide freedom of rotational movement of said sleeve relative to said hub for threading said hub along said sleeve in one direction or the other depending upon the direction of rotational movement imparted to said sleeve, said end flange and said end plate having bolt holes adjacent the perimeter thereof and said hub having tapped holes opening to the opposite ends thereof, and stud bolts threaded into tapped holes in the end of said hub nearest one end of the sleeve and extended through the corresponding bolt holes in said end flanges or said end plate.

References Cited in the file of this patent
UNITED STATES PATENTS

| Number | Name | Date |
|---|---|---|
| 2,235,457 | Lorimor | Mar. 18, 1941 |
| 2,584,410 | Abney | Feb. 5, 1952 |

FOREIGN PATENTS

| Number | Country | Date |
|---|---|---|
| 504,469 | Great Britain | Apr. 26, 1939 |
| 811,786 | Germany | Aug. 23, 1951 |